United States Patent
Lin

(10) Patent No.: US 11,677,434 B2
(45) Date of Patent: Jun. 13, 2023

(54) DATA TRANSMISSION METHOD FOR WIRELESS PERIPHERAL DEVICE

(71) Applicant: Primax Electronics Ltd., Taipei (TW)

(72) Inventor: Chien-Nan Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 120 days.

(21) Appl. No.: 17/212,810

(22) Filed: Mar. 25, 2021

(65) Prior Publication Data
US 2022/0173763 A1 Jun. 2, 2022

(30) Foreign Application Priority Data
Dec. 2, 2020 (TW) ................. 109142331

(51) Int. Cl.
*H04B 1/44* (2006.01)
*H04L 1/1607* (2023.01)
*H04W 72/0446* (2023.01)
*H04L 1/00* (2006.01)
*H04L 1/1829* (2023.01)

(52) U.S. Cl.
CPC ............ *H04B 1/44* (2013.01); *H04L 1/1607* (2013.01); *H04W 72/0446* (2013.01); *H04L 1/0025* (2013.01); *H04L 1/1835* (2013.01)

(58) Field of Classification Search
CPC ....... H04B 1/44; H04L 1/1607; H04L 1/0025; H04L 1/1835; H04L 1/1893; H04L 1/1671; H04W 72/0446
See application file for complete search history.

(56) References Cited

U.S. PATENT DOCUMENTS

| | | | |
|---|---|---|---|
| 10,992,338 B1* | 4/2021 | Priyantha | H04W 12/65 |
| 2008/0137545 A1* | 6/2008 | Shiue | H04W 36/30 370/250 |
| 2013/0077554 A1* | 3/2013 | Gauvreau | H04L 5/001 370/312 |
| 2021/0068033 A1* | 3/2021 | Seon | H04W 52/0254 |
| 2022/0110119 A1* | 4/2022 | Song | H04W 72/1263 |

\* cited by examiner

*Primary Examiner* — Nishant Divecha
(74) *Attorney, Agent, or Firm* — Kirton McConkie; Evan R. Witt

(57) ABSTRACT

A data transmission method for use between a wireless transmitter and a wireless receiver of a wireless peripheral device is provided. In a frequency hopping procedure, the wireless transmission data is re-transmitted through a secondary transmission channel. Consequently, a transmission delay problem is reduced. Moreover, the wireless receiver issues a special acknowledgement packet with loadable information to the wireless transmitter. Consequently, the master control power of the frequency hopping procedure is switched from the wireless transmitter to the wireless receiver. In addition, the information control capability of the wireless receiver to control the wireless transmitter in the communication application level can be increased.

2 Claims, 13 Drawing Sheets

DATA TRANSMISSION METHOD FOR WIRELESS PERIPHERAL DEVICE

FIELD OF THE INVENTION

The present invention relates to a data transmission method, and more particularly to a data transmission method for use in a frequency hopping procedure of a wireless peripheral device.

BACKGROUND OF THE INVENTION

Nowadays, a variety of wireless peripheral devices are widely used. For example, the wireless peripheral devices include a wireless mouse, a wireless keyboard, a wireless microphone, a wireless headset or any other possible wireless electronic device. In accordance with the data transmission technology, a frequency hopping procedure is used to prevent plural wireless peripheral devices from simultaneously using the same frequency band (e.g., 2.4 GHz) during the data transmission process. Consequently, the interference between the plural wireless peripheral devices can be avoided. By using the frequency hopping procedure, the original primary transmission channel is hopped to another primary transmission channel. Consequently, the wireless transmission data can be correctly transmitted and received.

FIG. 1A is a schematic functional block diagram illustrating the relationship between a conventional wireless peripheral device and a main system. As shown in FIG. 1A, the conventional wireless peripheral device comprises a wireless receiver 81 (e.g., a wireless mouse dongle) and a wireless transmitter 82 (e.g., a mouse body). The wireless receiver 81 is electrically connected with a USB port 11 of a main system 10 directly. Moreover, under control of a wireless transmitting/receiving control software/firmware 101, the wireless receiver 81 and the wireless transmitter 82 are in communication with each other to transmit/receive a wireless transmission data D1.

FIG. 1B is a flowchart illustrating a data transmission method for use in a frequency hopping procedure of a conventional wireless peripheral device. The data transmission method comprises a data transmitting process and a data receiving process. In addition, the data transmission method at least comprises the following steps. Please also refer to FIG. 1A.

In a step S10, the data transmission method is started.

Then, a step S11 is performed to judge whether the wireless receiver 81 receives the wireless transmission data D1 from the wireless transmitter 82 through a primary transmission channel within a first time interval.

If the judging result of the step S11 indicates that the wireless receiver 81 receives the wireless transmission data D1 through the primary transmission channel, the wireless receiver 81 processes the wireless transmission data D1 and continuously receives another wireless transmission data through the primary transmission channel (Step S12). Then, the step S11 is performed again.

If the judging result of the step S11 indicates that the wireless receiver 81 has not received the wireless transmission data D1, the wireless transmitter 82 confirms another primary transmission channel that has not been occupied (Step S13).

When the wireless receiver 81 is unable to receive the wireless transmission data D1, the wireless transmitter 82 issues a primary transmission channel change notification through at least one secondary transmission channel in a broadcast polling manner (Step S14).

After the step S14, a step S15 is performed to judge whether the wireless receiver 81 receives the primary transmission channel change notification from the wireless transmitter 82 through at least one secondary transmission channel within a second time interval.

After the wireless receiver 81 responds to the confirmation of receiving the primary transmission channel change notification, the wireless transmitter 82 re-transmits the same wireless transmission data D1 or transmits another wireless transmission data to the wireless receiver 81 through another primary transmission channel that has not been occupied (Step S16), and the step S11 is performed again.

From the steps S13 to S16, it can be found that the conventional data transmission method still has some drawbacks. For example, the wireless transmitter 82 has to issue the primary transmission channel change notification through at least one secondary transmission channel. After the wireless receiver 81 responds to the confirmation of receiving the primary transmission channel change notification, the wireless transmitter 82 re-transmits the same wireless transmission data D1 or transmits another wireless transmission data. Under this circumstance, a transmission delay problem occurs.

The conventional data transmission method has another problem. From the steps S13 to S16, it can be found that the master control power of the frequency hopping procedure is manipulated and activated by the wireless transmitter 82. However, if a single wireless receiver cooperates with plural wireless transmitters, the conventional data transmission method is infeasible or difficult to be implemented.

SUMMARY OF THE INVENTION

An object of the present invention provides a data transmission method for use in a wireless peripheral device. While a frequency hopping procedure is performed, the same wireless transmission data can be re-transmitted through the secondary transmission channel directly. Consequently, the transmission delay problem can be overcome.

Another object of the present invention provides a data transmission method for use in a wireless peripheral device. While a frequency hopping procedure is performed, the master control power of the frequency hopping procedure is switched from a wireless transmitter of the wireless peripheral device to a wireless receiver of the wireless peripheral device.

A further object of the present invention provides a data transmission method for use in a wireless peripheral device. While a frequency hopping procedure is performed, a wireless receiver of the wireless peripheral device issues a receiving/transmitting acknowledgement package with loadable information. Consequently, the information control capability of the wireless receiver to control a wireless transmitter of the wireless peripheral device in the communication application level can be increased.

In accordance with an aspect of the present invention, a data transmission method for use between a wireless transmitter and a wireless receiver of a wireless peripheral device is provided. The data transmission method includes a data receiving process. The data receiving process is implemented by the wireless receiver. The data receiving process at least includes the following steps. Firstly, a judging step is performed to judge whether a wireless transmission data from the wireless transmitter is received through a primary transmission channel within a first time interval. If the wireless transmission data from the primary transmission channel is received, the wireless receiver is temporarily switched to a transmitting mode and a first receiving/transmitting acknowledgement packet is set back to the wireless transmitter which is temporarily switched to a receiving mode. Then, the wireless transmission data from the primary transmission channel is recognized and processed, and another wireless transmission data is continuously received through the primary transmission channel. If the wireless transmission data is not received through the primary transmission channel, a judging step is performed to judge whether the same wireless transmission data through at least one secondary transmission channel is received within a second time interval. If the wireless transmission data is received through the at least one secondary transmission channel, the wireless receiver is temporarily switched to the transmitting mode and a second receiving/transmitting acknowledgement packet is sent to the wireless transmitter which is temporarily switched to the receiving mode. The second receiving/transmitting acknowledgement packet contain a primary transmission channel change information. The wireless transmitter transmits another wireless transmission data through another primary transmission channel in response to the primary transmission channel change information. Then, the wireless transmission data from the at least one secondary transmission channel is recognized and processed, and another wireless transmission data is continuously received through another primary transmission channel that has not been occupied.

In an embodiment, if the wireless transmission data is not received through the primary transmission channel, the data transmission method further include the following steps. Firstly, a checking step is performed to check whether the second receiving/transmitting acknowledgement packet has been stored in a buffer storage space. If the second receiving/transmitting acknowledgement packet has not been stored in the buffer storage space, the wireless receiver adds the primary transmission channel change information to the second receiving/transmitting acknowledgement packet and stores the second receiving/transmitting acknowledgement packet in the buffer storage space.

In an embodiment, if the wireless transmission data from the primary transmission channel is received, the data transmission method further include the following steps. Firstly, a judging step is performed to judge whether a transmitting/receiving acknowledgement request from the wireless transmitter is received. If no transmitting/receiving acknowledgement request from the wireless transmitter is received, the wireless receiver directly performs the step of recognizing and processing the wireless transmission data from the primary transmission channel and continuously receiving another wireless transmission data through the primary transmission channel. If the transmitting/receiving acknowledgement request from the wireless transmitter is received, the wireless receiver is temporarily switched to the transmitting mode and the first receiving/transmitting acknowledgement packet is sent back to the wireless transmitter which is temporarily switched to a receiving mode. Then, the step of recognizing and processing the wireless transmission data from the primary transmission channel and continuously receiving another wireless transmission data through the primary transmission channel is performed.

In accordance with an aspect of the present invention, a data transmission method for use between a wireless transmitter and a wireless receiver of a wireless peripheral device is provided. The data transmission method includes a data receiving process. The data receiving process is implemented by the wireless receiver. The data receiving process at least includes the following steps. Firstly, a judging step is performed to judge whether a wireless transmission data from the wireless transmitter is received through a primary transmission channel within a first time interval. If the wireless transmission data from the primary transmission channel is received, the wireless transmission data from the primary transmission channel is recognized and processed, and another wireless transmission data is continuously received through the primary transmission channel. If the wireless transmission data is not received through the primary transmission channel, a judging steps is performed to judge whether the same wireless transmission data through at least one secondary transmission channel is received within a second time interval. If the wireless transmission data is received through the at least one secondary transmission channel, the wireless transmission data from the at least one secondary transmission channel is recognized and processed, and the wireless transmitter transmits another wireless transmission data through another primary transmission channel that has not been occupied.

In an embodiment, if the wireless transmission data through the primary transmission channel is received, the data transmission method further includes steps of allowing the wireless receiver to be temporarily switched to a transmitting mode and send back a first receiving/transmitting acknowledgement packet to the wireless transmitter which is temporarily switched to a receiving mode, and performing the step of recognizing and processing the wireless transmission data from the primary transmission channel and continuously receiving another wireless transmission data through the primary transmission channel.

In an embodiment, if the wireless transmission data from the primary transmission channel is received, the data transmission method further include the following steps. Firstly, a judging step is performed to judge whether a transmitting/receiving acknowledgement request from the wireless transmitter is received. If no transmitting/receiving acknowledgement request from the wireless transmitter is received, the wireless receiver directly performs the step of recognizing and processing the wireless transmission data from the primary transmission channel and continuously receiving another wireless transmission data through the primary transmission channel. If the transmitting/receiving acknowledgement request from the wireless transmitter is received, the wireless receiver is temporarily switched to the transmitting mode and the first receiving/transmitting acknowledgement packet is sent to the wireless transmitter which is temporarily switched to a receiving mode. Then, the step of recognizing and processing the wireless transmission data from the primary transmission channel and continuously receiving another wireless transmission data through the primary transmission channel is performed.

In an embodiment, if the wireless transmission data is not received through the primary transmission channel, the data transmission method further include the following steps. Firstly, a checking step is performed to check whether a second receiving/transmitting acknowledgement packet has been stored in a buffer storage space. If the second receiving/transmitting acknowledgement packet has not been stored in the buffer storage space, the wireless receiver adds the primary transmission channel change information to the second receiving/transmitting acknowledgement packet and stores the second receiving/transmitting acknowledgement packet in the buffer storage space.

In an embodiment, the second receiving/transmitting acknowledgement packet further contains a wireless receiver time sequence information or an application function information for controlling the wireless transmitter.

In an embodiment, if the wireless transmission data is received through the at least one secondary transmission channel, the data transmission method further includes a step of allowing the wireless receiver to be temporarily switched to a transmitting mode and send back the receiving/transmitting acknowledgement packet to the wireless transmitter which is temporarily switched to a receiving mode. The second receiving/transmitting acknowledgement packet contain the primary transmission channel change information, and the wireless transmitter transmits another wireless transmission data through another primary transmission channel in response to the primary transmission channel change information.

In accordance with an aspect of the present invention, a data transmission method for use between a wireless transmitter and a wireless receiver of a wireless peripheral device is provided. The data transmission method includes a data transmitting process. The data transmitting process is implemented by the wireless transmitter. The data transmitting process at least includes the following steps. Firstly, a triggering event is waited. Then, the wireless transmitter transmits a wireless transmission data through a primary transmission channel in response to the triggering event. Then, a judging step is performed to judge whether a first receiving/transmitting acknowledgement packet from the wireless receiver is received. If the first receiving/transmitting acknowledgement packet from the wireless receiver is received, the wireless transmitter continuously waits for another triggering event. If the first receiving/transmitting acknowledgement packet from the wireless receiver is not received, a judging step is performed to judge whether a transmitting failure count of the wireless transmitter exceeds a first threshold value within a first time interval. If the transmitting failure count of the wireless transmitter does not exceed the first threshold value, the wireless transmitter continuously transmits the wireless transmission data through the primary transmission channel. If the transmitting failure count of the wireless transmitter exceeds the first threshold value, the wireless transmitter transmits the same wireless transmission data through one of plural secondary transmission channels. Then, a judging step is performed to judge whether a second receiving/transmitting acknowledgement packet containing the primary transmission channel change information and from the wireless receiver is received. If the second receiving/transmitting acknowledgement packet containing the primary transmission channel change information and from the wireless receiver is received, the wireless transmitter transmits another wireless transmission data through another primary transmission channel in response to the primary transmission channel change information. If the second receiving/transmitting acknowledgement packet containing the primary transmission channel change information and from the wireless receiver is not received, a judging step is performed to judge whether the transmitting failure count of the wireless transmitter exceeds a second threshold value and all of the plural secondary transmission channels have been broadcast-polled within a second time interval. If the wireless transmitter does not exceed the second threshold value or all of the plural secondary transmission channels have not been broadcast-polled, the wireless transmitter continuously transmits the same wireless transmission data through other secondary transmission channels that have not been used until the transmitting failure count of the wireless transmitter exceeds the second threshold value and all of the plural secondary transmission channels have been broadcast-polled.

In an embodiment, after the wireless transmitter transmits the wireless transmission data through the primary transmission channel in response to the triggering event, the data transmission method further include the following steps. Firstly, a judging step is performed to judge whether the wireless transmitter transmits a transmitting/receiving acknowledgement request. If the wireless transmitter transmits the transmitting/receiving acknowledgement request, the step of judging whether a first receiving/transmitting acknowledgement packet from the wireless receiver is received is performed. If the wireless transmitter does not transmit the transmitting/receiving acknowledgement request, the wireless transmitter continuously transmits the wireless transmission data through the primary transmission channel for several times within a third time interval, and waits for another triggering event.

In an embodiment, the step of waiting for the triggering event includes the following sub-steps. Firstly, a judging step is performed to judge whether the triggering event is generated. If the triggering event is generated, the step of transmitting the wireless transmission data through the primary transmission channel in response to the triggering event is performed. If no triggering event is generated, the wireless transmitter transmits a virtual synchronous packet as the wireless transmission data through the primary transmission channel within a fourth time interval, and the step of judging whether the wireless transmitter transmits a transmitting/receiving acknowledgement request is performed.

In accordance with an aspect of the present invention, a data transmission method for use between a wireless transmitter and a wireless receiver of a wireless peripheral device is provided. The data transmission method includes a data transmitting process. The data transmitting process is implemented by the wireless transmitter. The data transmitting process at least includes the following steps. Firstly, a triggering event is waited. Then, the wireless transmitter transmits a wireless transmission data through a primary transmission channel in response to the triggering event. Then, a judging step is performed to judge whether a first receiving/transmitting acknowledgement packet from the wireless receiver is received. If the first receiving/transmitting acknowledgement packet from the wireless receiver is received, the wireless transmitter continuously waits for another triggering event. If the first receiving/transmitting acknowledgement packet from the wireless receiver is not received, the wireless transmitter transmits the same wireless transmission data through a secondary transmission channel of plural secondary transmission channels. Then, a judging step is performed to judge whether a second receiving/transmitting acknowledgement packet containing the primary transmission channel change information and from the wireless receiver is received. If the second receiving/transmitting acknowledgement packet containing the primary transmission channel change information and from the wireless receiver is received, the wireless transmitter transmits another wireless transmission data through another primary transmission channel in response to the primary transmission channel change information.

In an embodiment, after the first receiving/transmitting acknowledgement packet from the wireless receiver is not received, the data transmission method further includes the following steps. Firstly, a judging step is performed to judge whether a transmitting failure count of the wireless transmitter exceeds a first threshold value within a first time interval. If the transmitting failure count of the wireless transmitter does not exceed the first threshold value, the wireless transmitter continuously transmits the wireless transmission data through the primary transmission channel. If the transmitting failure count of the wireless transmitter exceeds the first threshold value, the wireless transmitter transmits the same wireless transmission data through the secondary transmission channel.

In an embodiment, the data transmission method further includes the following steps. If the second receiving/transmitting acknowledgement packet containing the primary transmission channel change information and from the wireless receiver is not received, a judging step is performed to judge whether the transmitting failure count of the wireless transmitter exceeds a second threshold value and all of the plural secondary transmission channels have been broadcast-polled within a second time interval. If the wireless transmitter does not exceed the second threshold value or all of the plural secondary transmission channels have not been broadcast-polled, the wireless transmitter continuously transmits the same wireless transmission data through other secondary transmission channels that have not been used until the transmitting failure count of the wireless transmitter exceeds the second threshold value and all of the plural secondary transmission channels have been broadcast-polled.

In an embodiment, after the wireless transmitter transmits the wireless transmission data through the primary transmission channel in response to the triggering event, the data transmission method further includes the following steps. Firstly, a judging step is performed to judge whether the wireless transmitter transmits a transmitting/receiving acknowledgement request. If the wireless transmitter transmits the transmitting/receiving acknowledgement request, the step of judging whether a first receiving/transmitting acknowledgement packet from the wireless receiver is received is performed. If the wireless transmitter does not transmit the transmitting/receiving acknowledgement request, the wireless transmitter continuously transmits the wireless transmission data through the primary transmission channel for several times within a third time interval, and waits for another triggering event.

In an embodiment, the step of waiting for the triggering event includes the following sub-steps. Firstly, a judging step is performed to judge whether the triggering event is generated. If the triggering event is generated, the step of transmitting the wireless transmission data through the primary transmission channel in response to the triggering event is performed. If no triggering event is generated, the wireless transmitter transmits a virtual synchronous packet as the wireless transmission data through the primary transmission channel within a fourth time interval, and the step of judging whether the wireless transmitter transmits the transmitting/receiving acknowledgement request is performed.

In an embodiment, the second receiving/transmitting acknowledgement packet further contains a wireless receiver time sequence information or an application function information for controlling the wireless transmitter.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 2:
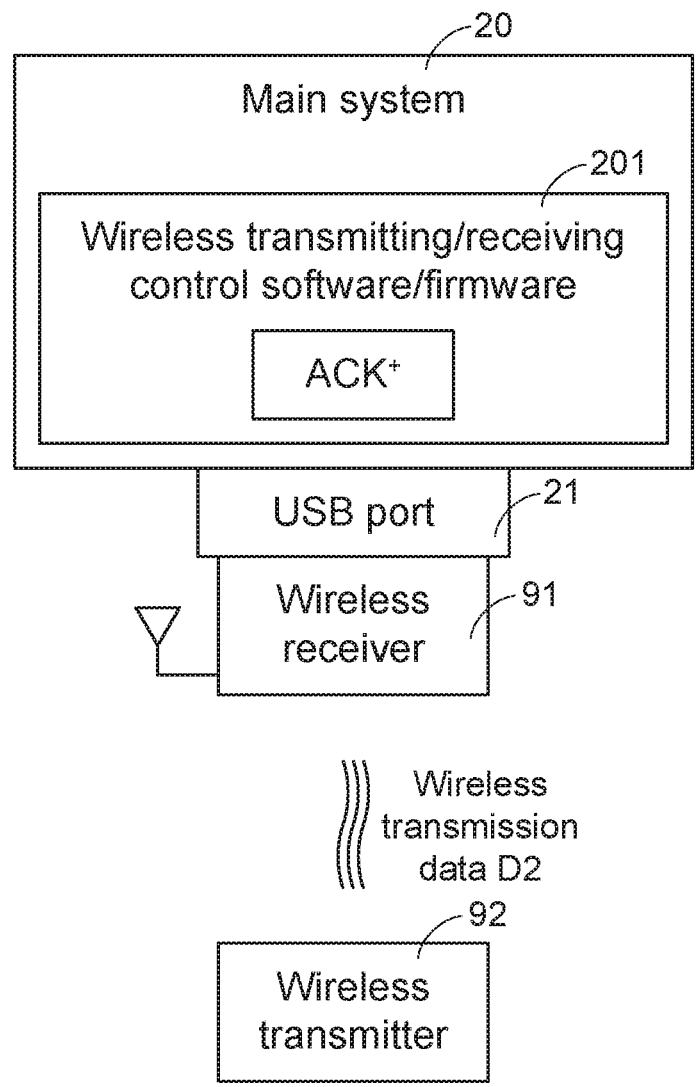
FIG. 2 is a schematic functional block diagram illustrating the relationship between a wireless peripheral device and a main system according to an embodiment of the present invention.

The present invention provides a data transmission method for a wireless peripheral device. FIG. 2 is a schematic functional block diagram illustrating the relationship between a wireless peripheral device and a main system according to an embodiment of the present invention. Some embodiments of the data transmission method will be described as follows. In these embodiments, the data transmission method is used between the wireless peripheral device and the main system 20. As shown in FIG. 2, the wireless peripheral device comprises a wireless receiver 91 and a wireless transmitter 92. The wireless receiver 91 is electrically connected with a USB port 21 of the main system 20 directly. Moreover, under control of a wireless transmitting/receiving control software/firmware 201, the wireless receiver 91 and the wireless transmitter 92 are in communication with each other to transmit/receive a wireless transmission data D2. In accordance with a feature of the present invention, a special acknowledgement packet (ACK+) with loadable information is employed during the process of transmitting/receiving the wireless transmission data D2. The acknowledgement packet will be described lateral. In this way, the drawbacks of the conventional technologies can be overcome, and the diversity of the transmission data and the application flexibility will be increased.

The wireless peripheral device applied to the present invention includes but is not limited to a wireless mouse, a wireless keyboard, a wireless microphone, a wireless headset or any other appropriate wireless electronic device.

The wireless receiver 91 is usually in a receiving mode (Rx mode), but the wireless receiver 91 is temporarily switched to a transmitting mode (Tx mode) when necessary. The wireless transmitter 92 is usually in the transmitting mode, but the wireless transmitter 92 is temporarily switched to the receiving mode when necessary. The detailed descriptions will be omitted herein.

Figure 3A:
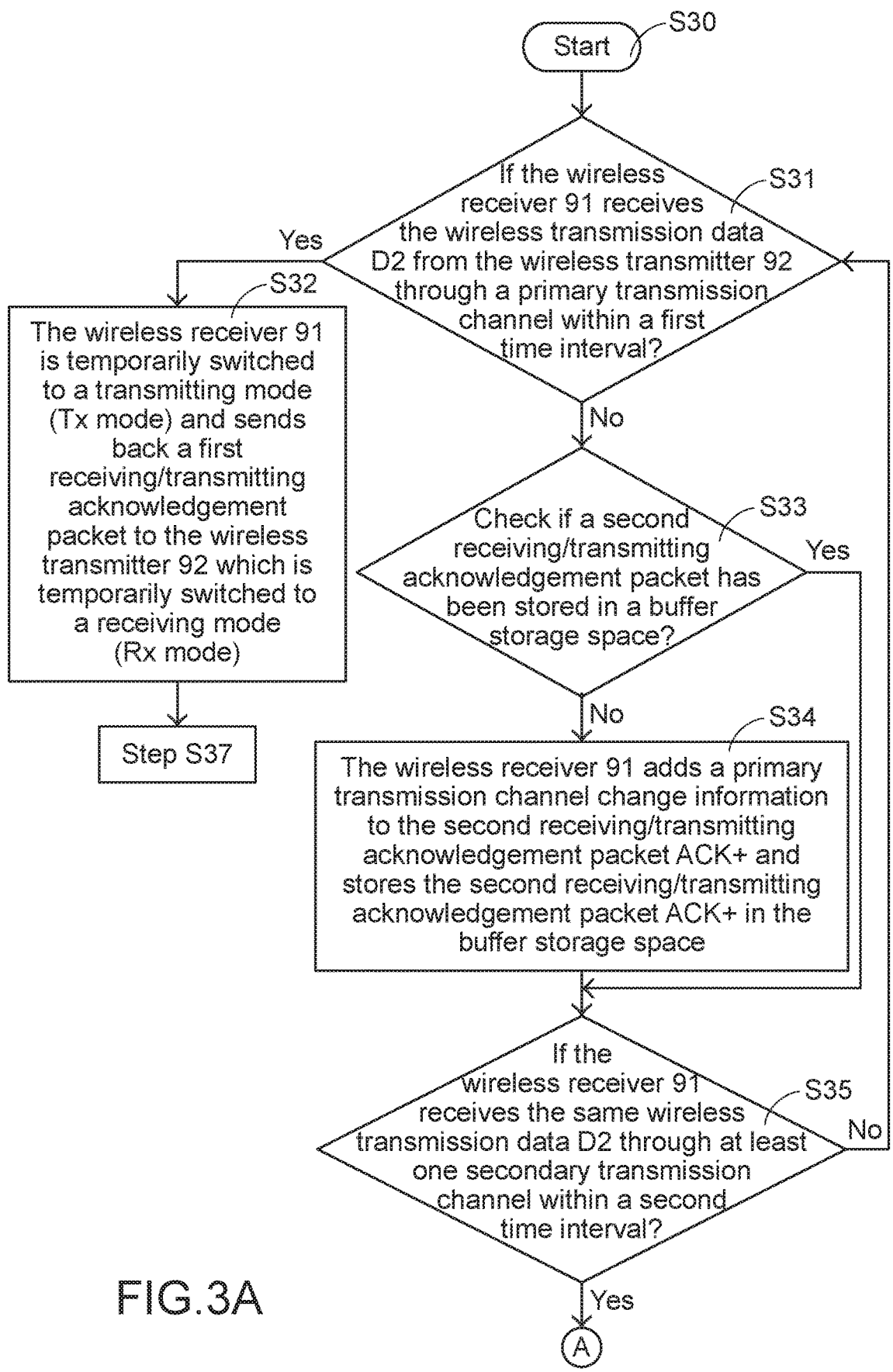
FIGS. 3A and 3B illustrate a flowchart of a data receiving process of a data transmission method according to a first embodiment of the present invention.
Figure 3B:
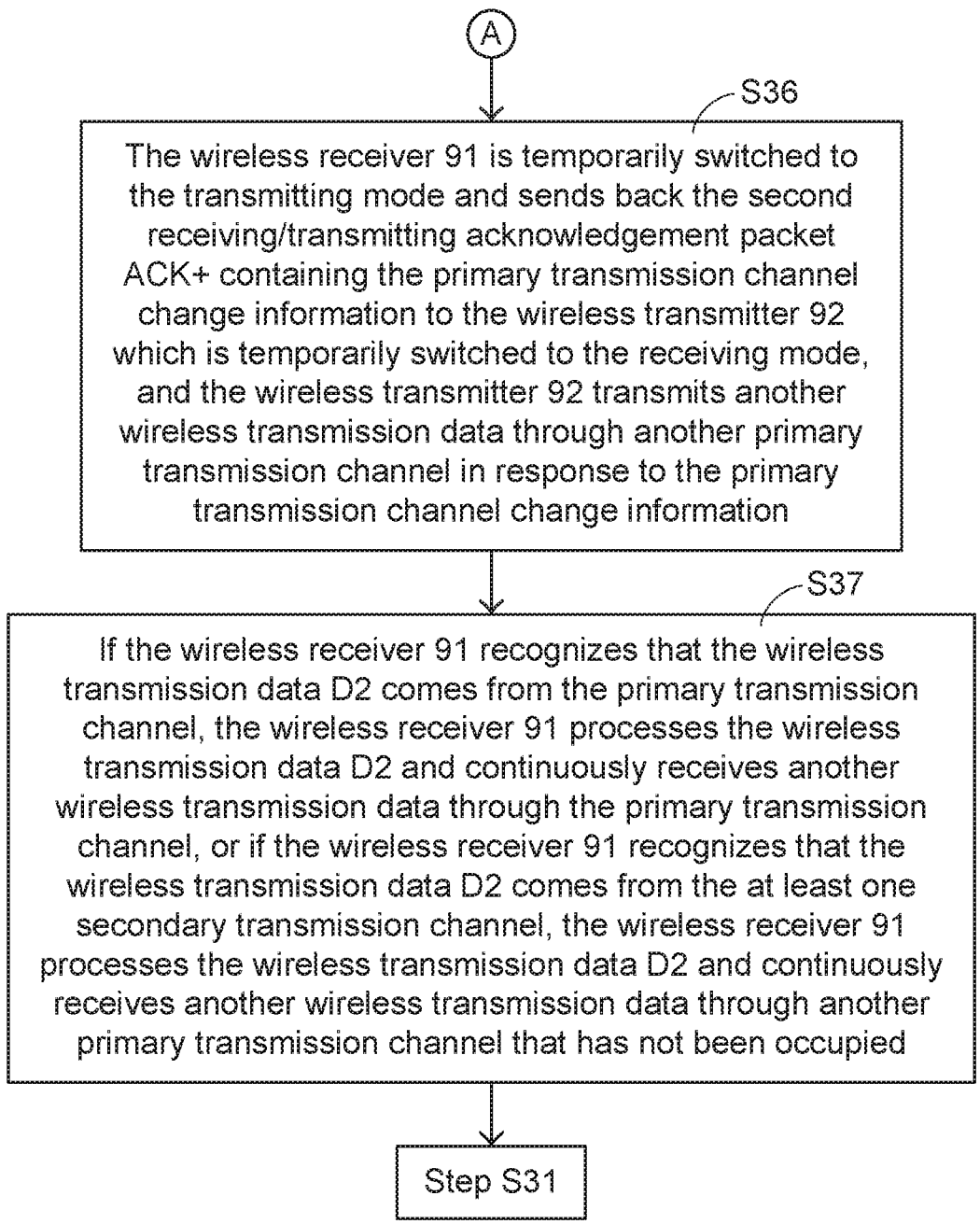

FIGS. 3A and 3B illustrate a flowchart of a data receiving process of a data transmission method according to a first embodiment of the present invention. Please also refer to FIG. 2.

The data receiving process is implemented by the wireless receiver 91. As shown in FIGS. 3A and 3B, the data receiving process of the data transmission method in the first embodiment of the present invention at least comprises the following steps.

In a step S30, the data receiving process is started.

Then, a step S31 is performed to judge whether the wireless receiver 91 receives the wireless transmission data D2 from the wireless transmitter 92 through a primary transmission channel within a first time interval. For example, the channel number of the primary transmission channels is at least 13, and the first time interval is at least 8~16 millisecond (ms).

If the wireless receiver 91 receives the wireless transmission data D2 through the primary transmission channel, the wireless receiver 91 is temporarily switched to a transmitting mode (Tx mode) and sends back a first receiving/transmitting acknowledgement packet to the wireless transmitter 92 which is temporarily switched to a receiving mode (Rx mode) (Step S32). For example, the first receiving/transmitting acknowledgement packet is a general receiving/transmitting acknowledgement packet without loadable information.

If the wireless receiver 91 recognizes that the wireless transmission data D2 comes from the primary transmission channel, the wireless receiver 91 processes the wireless transmission data D2 and continuously receives another wireless transmission data through the primary transmission channel (Step S37). Then, the step S31 is performed again.

If the judging result of the step S31 indicates that the wireless receiver 91 has not received the wireless transmission data D2 through the primary transmission channel, the wireless receiver 91 checks whether a second receiving/transmitting acknowledgement packet has been stored in a buffer storage space (Step S33). In an embodiment, the buffer storage space is installed in one of the main system 20 and the wireless receiver 91 as shown in FIG. 2. Preferably, the second receiving/transmitting acknowledgement packet is a special acknowledgement packet (ACK+) with loadable information. That is, the required control information can be additionally loaded to the second receiving/transmitting acknowledgement packet.

If the second receiving/transmitting acknowledgement packet ACK+ has not been stored in the buffer storage space, the wireless receiver 91 adds a primary transmission channel change information to the second receiving/transmitting acknowledgement packet ACK+ and stores the second receiving/transmitting acknowledgement packet ACK+ in the buffer storage space (Step S34).

After the second receiving/transmitting acknowledgement packet ACK+ has been stored in the buffer storage space, a step S35 is performed to judge whether the wireless receiver 91 receives the same wireless transmission data D2 through at least one secondary transmission channel within a second time interval. If no wireless transmission data D2 is received through any of the at least one secondary transmission channel, the step S31 is performed again. In an embodiment, the at least one secondary transmission channel includes two or more than two secondary transmission channels, and the second time interval is at least 2~4 millisecond (ms).

If the wireless transmission data D2 is received through the at least one secondary transmission channel, the wireless receiver 91 is temporarily switched to the transmitting mode and sends back the second receiving/transmitting acknowledgement packet ACK+ containing the primary transmission channel change information to the wireless transmitter 92 which is temporarily switched to the receiving mode, and the wireless transmitter 92 transmits another wireless transmission data through another primary transmission channel in response to the primary transmission channel change information (Step S36).

After the wireless receiver 91 recognizes that the wireless transmission data D2 comes from the at least one secondary transmission channel, the wireless receiver 91 processes the wireless transmission data D2 and continuously receives another wireless transmission data through another primary transmission channel that has not been occupied (Step S37). Then, the step S31 is performed again.

As mentioned above, the data receiving process of the first embodiment implemented by the wireless receiver 91 is advantageous over the conventional technology. If the wireless receiver 91 has not received the wireless transmission data D2 through the primary transmission channel, the wireless receiver 91 can still receive the wireless transmission data D2 through the at least one secondary transmission channel directly. According to the conventional technology, the wireless receiver has to firstly receive the primary transmission channel change notification through the at least one secondary transmission channel and then wireless transmitter re-transmits the same wireless transmission data D2 or transmits another wireless transmission data. Consequently, the technology of the present invention can overcome the transmission delay problem.

Figure 1A:
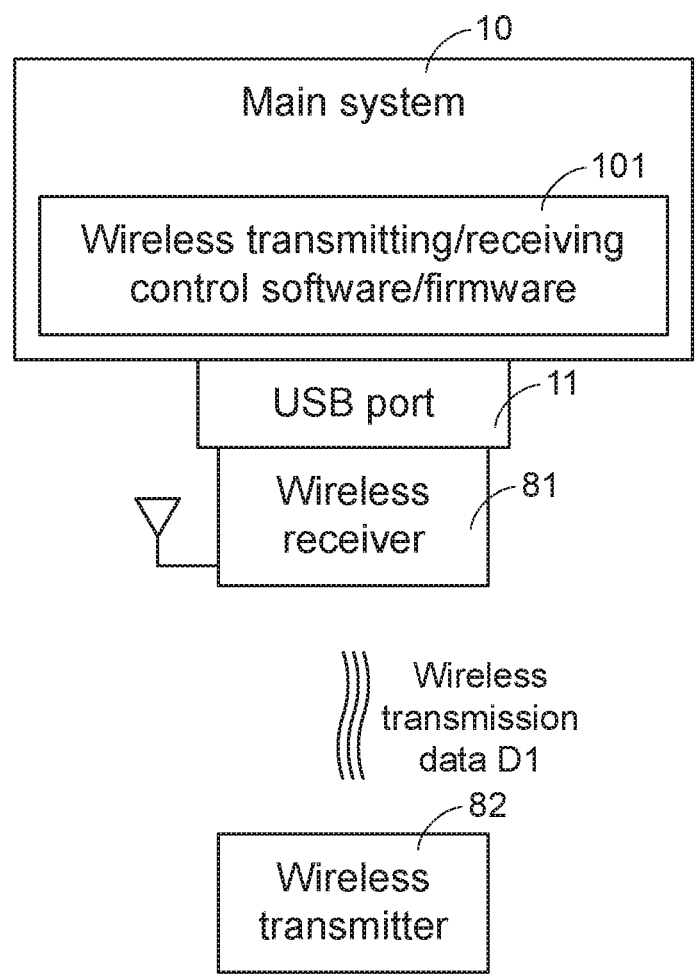
FIG. 1A is a schematic functional block diagram illustrating the relationship between a conventional wireless peripheral device and a main system.
Figure 1B:
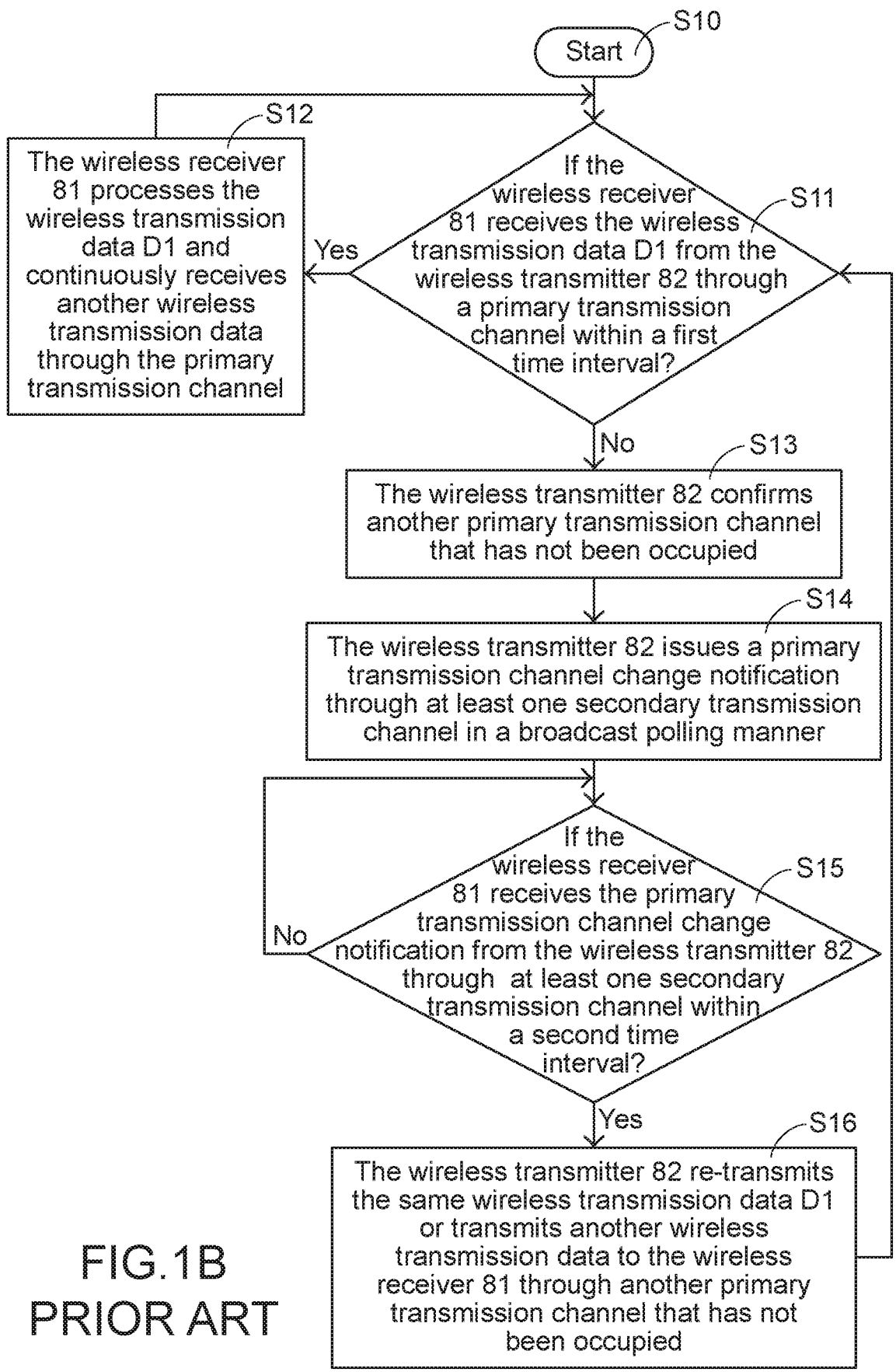
FIG. 1B is a flowchart illustrating a data transmission method for use in a frequency hopping procedure of a conventional wireless peripheral device.

According to the conventional technology, the master control power of the frequency hopping procedure is manipulated by the wireless transmitter 82 as shown in FIG. 1A. In accordance with the present invention, when the wireless receiver 91 receives the wireless transmission data D2 through the at least one secondary transmission channel, the wireless receiver 91 actively sends back the second receiving/transmitting acknowledgement packet ACK+ containing the primary transmission channel change information to the wireless transmitter 92. In other words, the master control power of the frequency hopping procedure is actively manipulated by the wireless receiver 91 as shown in FIG. 2. In this way, the wireless receiver 91 is suitably used to control and manage plural wireless transmitters 92 simultaneously.

Moreover, the second receiving/transmitting acknowledgement packet ACK+ containing the primary transmission channel change information is previously placed and early prepared in the buffer storage space. The early preparation can obviously reduce the time period of the conversion and communication of transmitting/receiving the wireless transmission data D2.

Figure 4A:
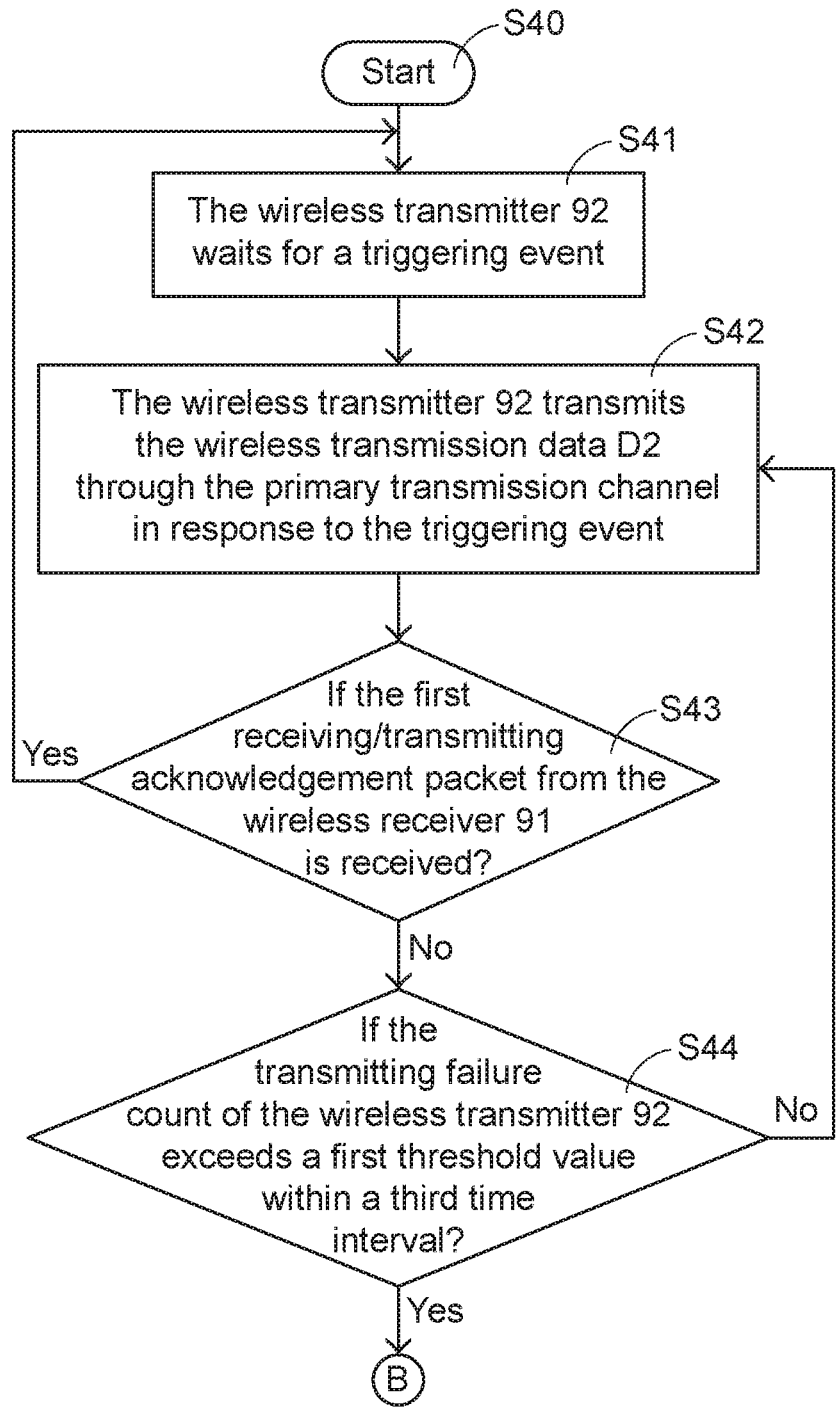
FIGS. 4A and 4B illustrate a flowchart of a data transmitting process of the data transmission method according to the first embodiment of the present invention.
Figure 4B:
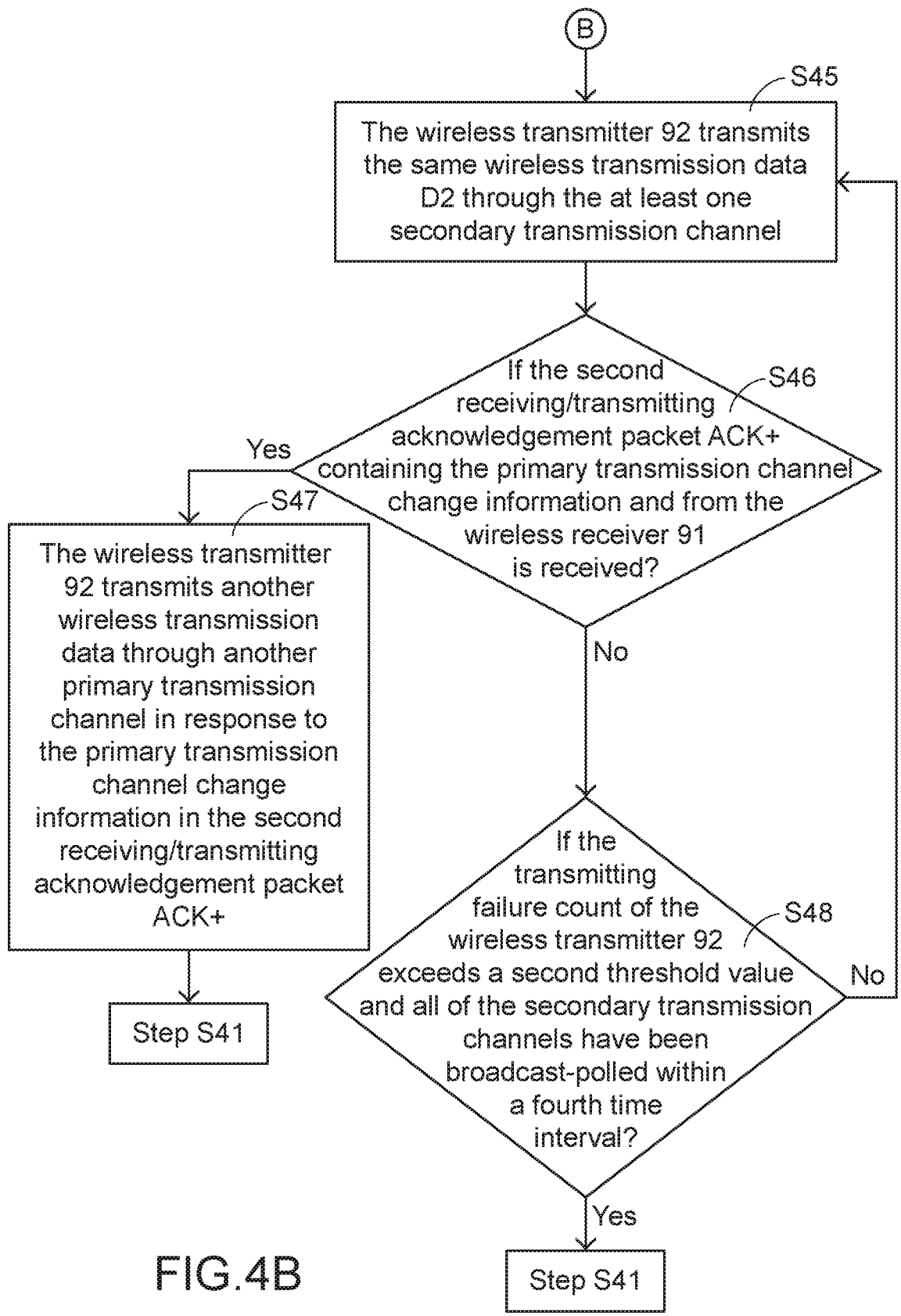

As mentioned above, the wireless receiver 91 can receive the wireless transmission data D2 through the at least one secondary transmission channel directly, and the master control power of the frequency hopping procedure is actively manipulated by the wireless receiver 91. The detailed operations can be further understood with reference to the flowchart of FIGS. 4A and 4B. FIGS. 4A and 4B illustrate a flowchart of a data transmitting process of the data transmission method according to the first embodiment of the present invention. Please also refer to FIGS. 2, 3A and 3B.

The wireless transmitter 92 cooperates with the wireless receiver 91 to implement the data transmitting process. As shown in FIGS. 4A and 4B, the data transmitting process of the data transmission method in the first embodiment of the present invention at least comprises the following steps.

In a step S40, the data transmitting process is started.

In a step S41, the wireless transmitter 92 waits for a triggering event.

In a step S42, the wireless transmitter 92 transmits the wireless transmission data D2 through the primary transmission channel in response to the triggering event.

Then, a step S43 is performed to judge whether the wireless transmitter 92 receives the first receiving/transmitting acknowledgement packet from the wireless receiver 91. If the first receiving/transmitting acknowledgement packet from the wireless receiver 91 is received, the wireless transmitter 92 continuously waits for another triggering event. That is, the step S41 is performed again.

If the first receiving/transmitting acknowledgement packet from the wireless receiver 91 is not received, a step S44 is performed to judge whether the transmitting failure count of the wireless transmitter 92 exceeds a first threshold value within a third time interval. If the transmitting failure count of the wireless transmitter 92 does not exceed the first threshold value, the step S42 is performed again. Consequently, the wireless transmitter 92 continuously transmits the wireless transmission data D2 through the primary transmission channel. For example, the first threshold value corresponding to the transmitting failure count is 8.

If the judging result of the step S44 indicates that the transmitting failure count of the wireless transmitter 92 exceeds the first threshold value, the wireless transmitter 92 transmits the same wireless transmission data D2 through the at least one secondary transmission channel (Step S45).

After the step S45, a step S46 is performed to judge whether the second receiving/transmitting acknowledgement packet ACK+ containing the primary transmission channel change information and from the wireless receiver 91 is received.

If the second receiving/transmitting acknowledgement packet ACK+ containing the primary transmission channel change information and from the wireless receiver 91 is received, the wireless transmitter 92 transmits another wireless transmission data through another primary transmission channel in response to the primary transmission channel change information in the second receiving/transmitting acknowledgement packet ACK+(Step S47), and the step S41 is performed again.

If the judging result of the step S46 indicates that the second receiving/transmitting acknowledgement packet ACK+ containing the primary transmission channel change information from the wireless receiver 91 is not received, a step S48 is performed to judge whether the transmitting failure count of the wireless transmitter 92 exceeds a second threshold value and all of the secondary transmission channels have been broadcast-polled within a fourth time interval. If the transmitting failure count of the wireless transmitter 92 does not exceed the second threshold value or all of the secondary transmission channels have not been broadcast-polled, the step S45 is performed again. Consequently, the wireless transmitter 92 continuously transmits the same wireless transmission data D2 through other secondary transmission channels that have not been used until the transmitting failure count of the wireless transmitter 92 exceeds the second threshold value and all of the secondary transmission channels have been broadcast-polled. For example, the second threshold value corresponding to the transmitting failure count is 8.

As mentioned above, the data transmitting process of the first embodiment implemented by the wireless transmitter 92 is advantageous over the conventional technology. If the first receiving/transmitting acknowledgement packet from the wireless receiver 91 has not been received after a certain time period, the wireless transmitter 92 transmits the same wireless transmission data D2 through the at least one secondary transmission channel directly. This process is unlike the conventional technology. That is, it is not necessary to receive the primary transmission channel change notification through the at least one secondary transmission channel before the wireless transmission data is transmitted.

Moreover, the wireless transmitter 92 needs to wait for the wireless receiver 91 to actively send back the second receiving/transmitting acknowledgement packet ACK+ containing the primary transmission channel change information from the wireless receiver 91. In response to the primary transmission channel change information, the wireless transmitter 92 transmits another wireless transmission data through another primary transmission channel. In other words, the master control power of the frequency hopping procedure is manipulated by the wireless receiver 91 of FIG. 2 rather than the wireless transmitter 82 of FIG. 1A.

As mentioned above, the second receiving/transmitting acknowledgement packet ACK+ contains the primary transmission channel change information. In some embodiments, the second receiving/transmitting acknowledgement packet ACK+ further contains a wireless receiver time sequence information or an application function information for controlling the wireless transmitter. Consequently, the diversity and the application flexibility of the information control capability of the wireless receiver 91 to control the wireless transmitter 92 in the communication application level can be increased.

Figure 5A:
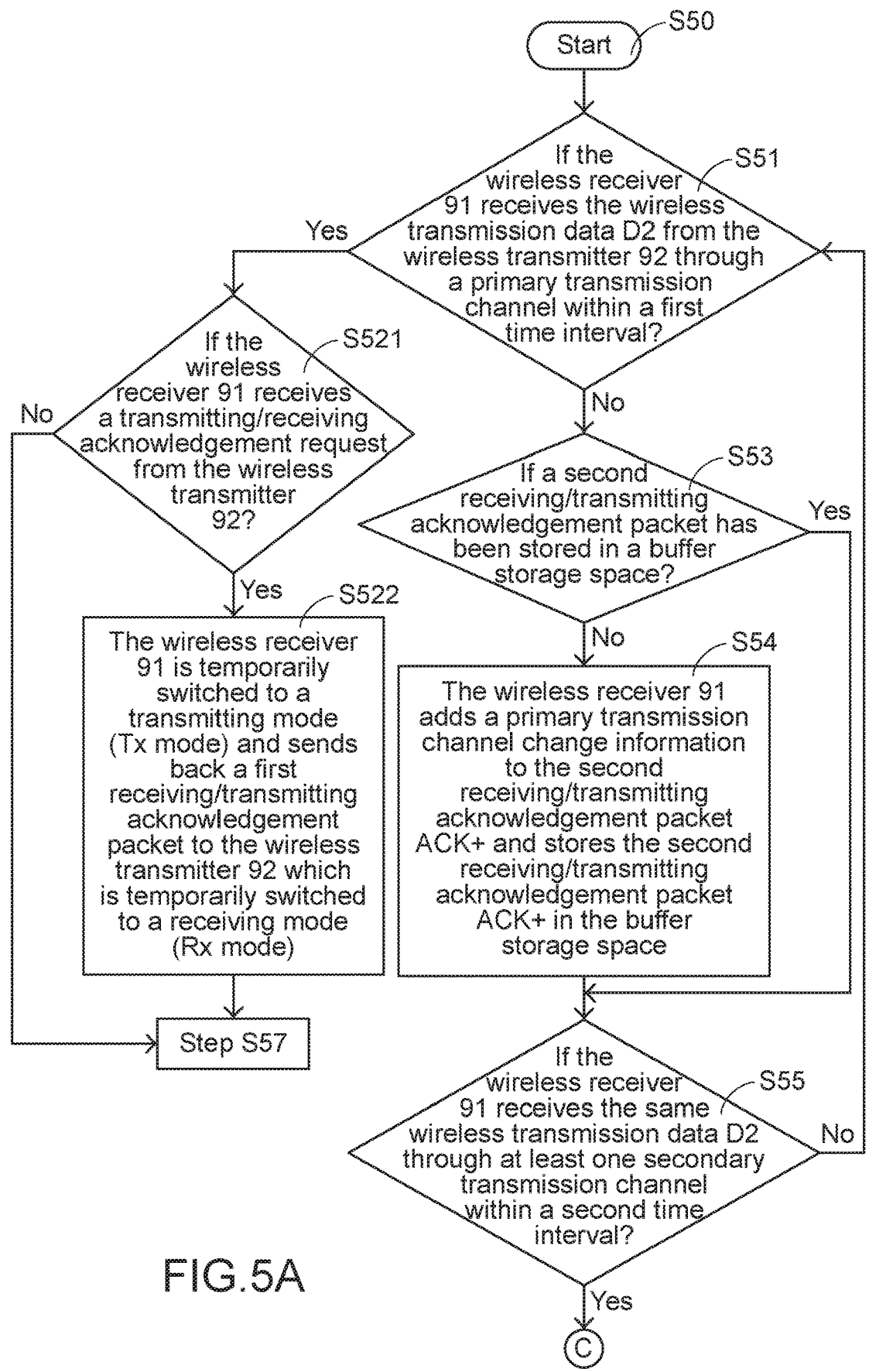
FIGS. 5A and 5B illustrate a flowchart of a data receiving process of a data transmission method according to a second embodiment of the present invention.
Figure 5B:
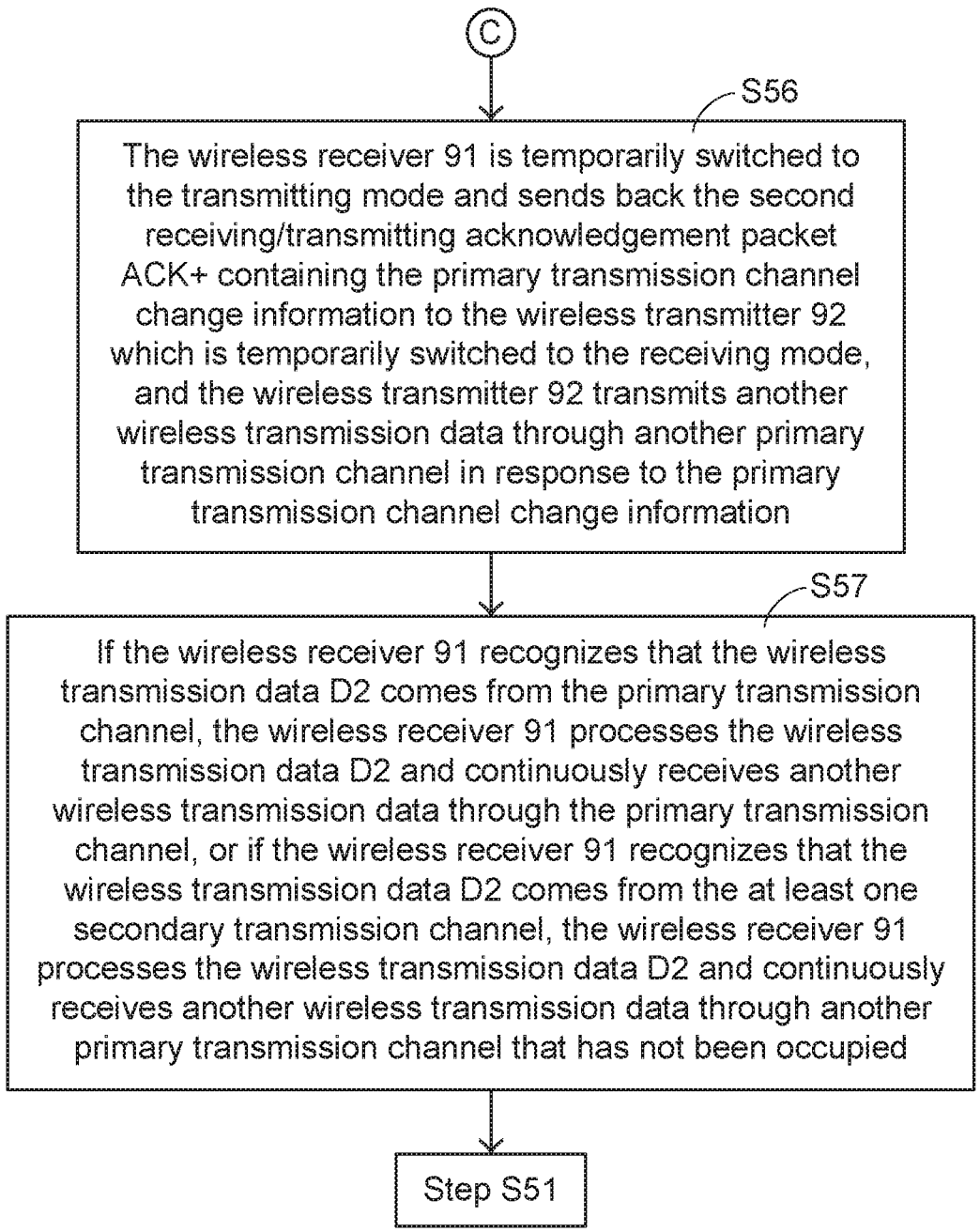

For enhancing the data transmission flexibility, the data transmission method of the present invention may be modified. FIGS. 5A and 5B illustrate a flowchart of a data receiving process of a data transmission method according to a second embodiment of the present invention. Please also refer to FIGS. 2, 3A and 3B.

The data receiving process is implemented by the wireless receiver 91. As shown in FIGS. 5A and 5B, the data receiving process of the data transmission method in the second embodiment of the present invention at least comprises the following steps.

In a step S50, the data receiving process is started.

Then, a step S51 is performed to judge whether the wireless receiver 91 receives the wireless transmission data D2 from the wireless transmitter 92 through a primary transmission channel within a first time interval. For example, the channel number of the primary transmission channels is at least 13, and the first time interval is at least 8~16 millisecond (ms).

If the wireless receiver 91 receives the wireless transmission data D2 through the primary transmission channel, a step S521 is performed to judge whether the wireless receiver 91 receives a transmitting/receiving acknowledgement request from the wireless transmitter 92. If no transmitting/receiving acknowledgement request from the wireless transmitter 92 is received, the wireless receiver 91 directly recognizes and processes the wireless transmission data D2 from the primary transmission channel and continuously receives another wireless transmission data through the primary transmission channel (Step S57). Then, the step S51 is performed again.

If the wireless transmission data D2 is received through the primary transmission channel and the transmitting/receiving acknowledgement request from the wireless transmitter 92 is received, the wireless receiver 91 is temporarily switched to a transmitting mode (Tx mode) and sends back a first receiving/transmitting acknowledgement packet to the wireless transmitter 92 which is temporarily switched to a receiving mode (Rx mode) (Step S522). If the wireless receiver 91 recognizes that the wireless transmission data D2 comes from the primary transmission channel, the wireless receiver 91 processes the wireless transmission data D2 and continuously receives another wireless transmission data through the primary transmission channel (Step S57). Then, the step S51 is performed again. For example, the first receiving/transmitting acknowledgement packet is a general receiving/transmitting acknowledgement packet without loadable information.

If the wireless receiver 91 has not received the wireless transmission data D2 through the primary transmission channel, the wireless receiver 91 checks whether a second receiving/transmitting acknowledgement packet has been stored in a buffer storage space (Step S53). In an embodiment, the buffer storage space is installed in one of the main system 20 and the wireless receiver 91 as shown in FIG. 2. Preferably, the second receiving/transmitting acknowledgement packet is a special acknowledgement packet (ACK+) with loadable information. That is, required control information can be additionally loaded to the second receiving/transmitting acknowledgement packet.

If the second receiving/transmitting acknowledgement packet ACK+ has not been stored in the buffer storage space, the wireless receiver 91 adds a primary transmission channel change information to the second receiving/transmitting acknowledgement packet ACK+ and stores the second receiving/transmitting acknowledgement packet ACK+ in the buffer storage space (Step S54).

After the second receiving/transmitting acknowledgement packet ACK+ has been stored in the buffer storage space, a step S55 is performed to judge whether the wireless receiver 91 receives the same wireless transmission data D2 through at least one secondary transmission channel within a second time interval. If no wireless transmission data D2 is received through any of the at least one secondary transmission channel, the step S51 is performed again. In an embodiment, the at least one secondary transmission channel includes two or more than two secondary transmission channels, and the second time interval is at least 2~4 millisecond (ms).

If the wireless transmission data D2 is received through the at least one secondary transmission channel, the wireless receiver 91 is temporarily switched to the transmitting mode and sends back the second receiving/transmitting acknowledgement packet ACK+ containing the primary transmission channel change information to the wireless transmitter 92 which is temporarily switched to the receiving mode, and the wireless transmitter 92 transmits another wireless transmission data through another primary transmission channel in response to the primary transmission channel change information (Step S56).

After the wireless receiver 91 recognizes that the wireless transmission data D2 comes from the at least one secondary transmission channel, the wireless receiver 91 processes the wireless transmission data D2 and continuously receives another wireless transmission data through another primary transmission channel that has not been occupied (Step S57). Then, the step S51 is performed again.

As mentioned above, the data receiving process of the second embodiment implemented by the wireless receiver 91 is advantageous over the conventional technology. Most of the implementation steps of this embodiment are identical or equivalent to the implementation steps as shown in FIGS. 3A and 3B. In comparison with the first embodiment, the data receiving process of this embodiment further comprises the steps S521 and S522 in order to additionally provide a processing mechanism. If no transmitting/receiving acknowledgement request from the wireless transmitter 92 is received, the step S522 is omitted. That is, the wireless receiver 91 does not need to send back the first receiving/transmitting acknowledgement packet to the wireless transmitter 92. Consequently, the overall data transmission efficiency is enhanced.

Figure 6A:
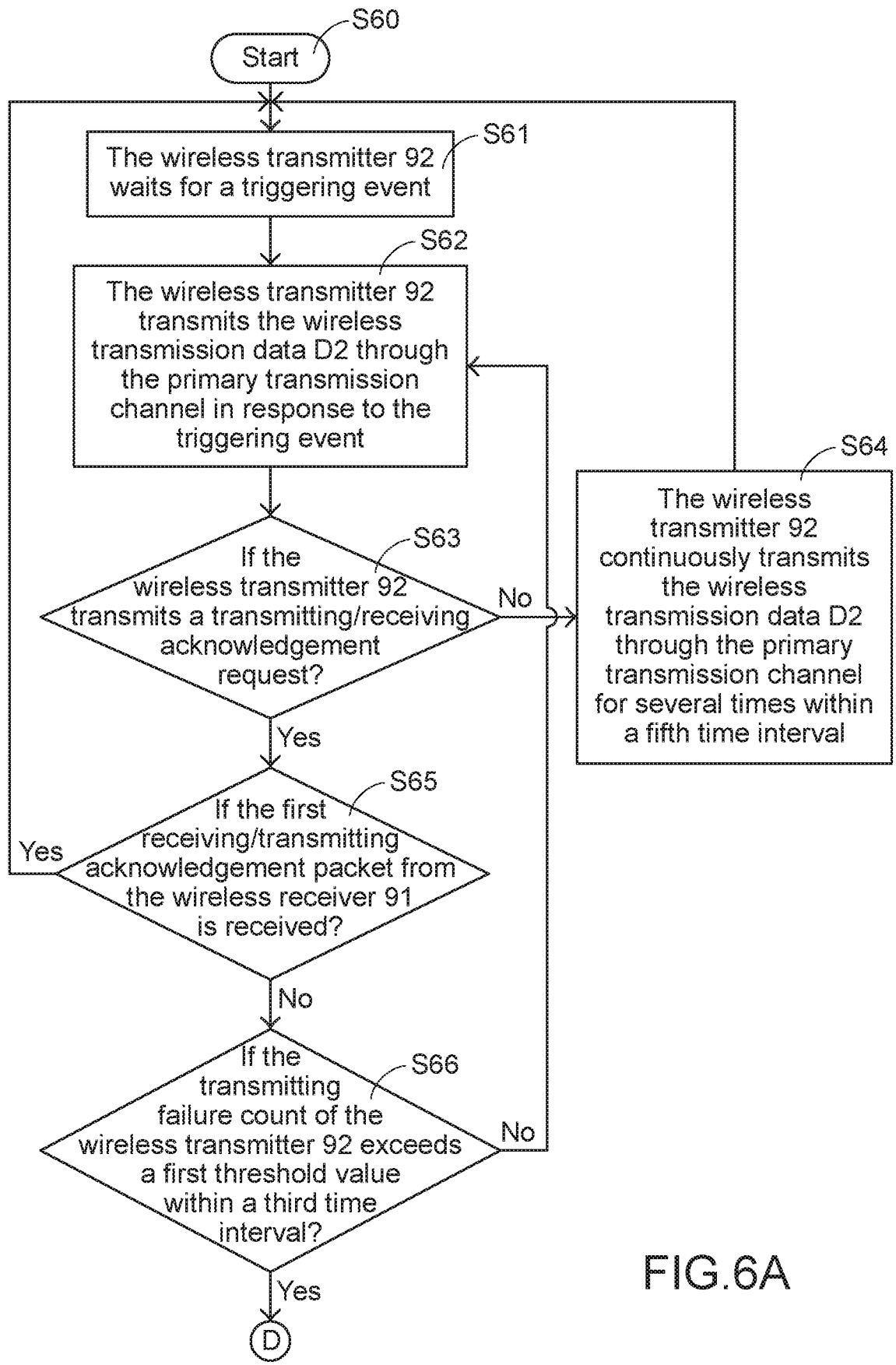
FIGS. 6A and 6B illustrate a flowchart of a data transmitting process of the data transmission method according to the second embodiment of the present invention.
Figure 6B:
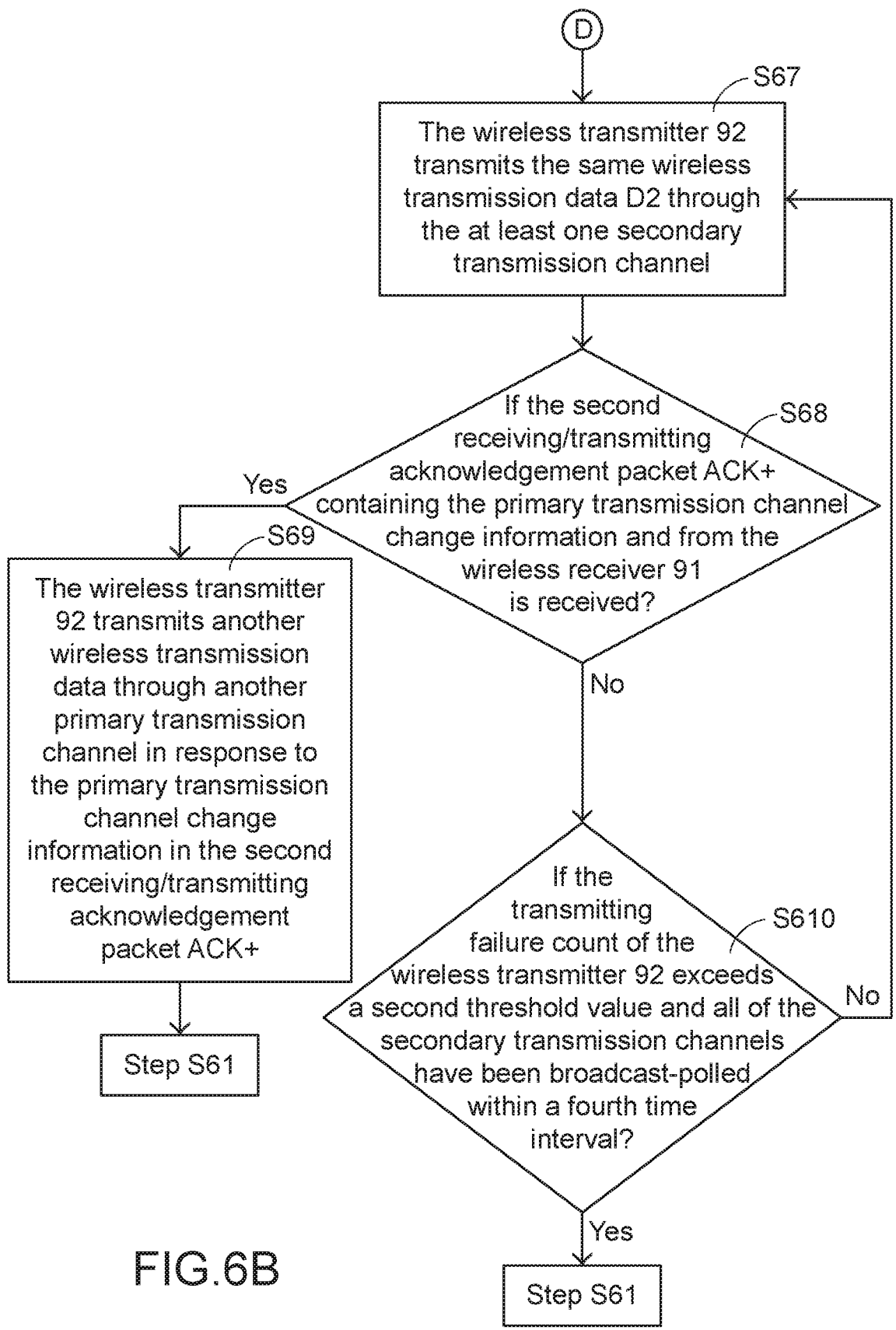

Moreover, the wireless transmitter 92 cooperates with the wireless receiver 91 to implement a data transmitting process in order to achieve the above advantages. The detailed operations can be further understood with reference to the flowchart of FIGS. 6A and 6B. FIGS. 6A and 6B illustrate a flowchart of a data transmitting process of the data transmission method according to the second embodiment of the present invention. Please also refer to FIGS. 2, 4A, 4B, 5A and 5B.

The wireless transmitter 92 cooperates with the wireless receiver 91 to implement the data transmitting process. As shown in FIGS. 6A and 6B, the data transmitting process of the data transmission method in the second embodiment of the present invention at least comprises the following steps.

In a step S60, the data transmitting process is started.

In a step S61, the wireless transmitter 92 waits for a triggering event.

In a step S62, the wireless transmitter 92 transmits the wireless transmission data D2 through the primary transmission channel in response to the triggering event.

Then, a step S63 is performed to judge whether the wireless transmitter 92 transmits a transmitting/receiving acknowledgement request.

If the judging result of the step S63 is not satisfied, the wireless transmitter 92 continuously transmits the wireless transmission data D2 through the primary transmission channel for several times within a fifth time interval (Step S64). Then, the wireless transmitter 92 waits for another triggering event, and the step S61 is performed again. If the judging result of the step S63 is satisfied, a step S65 is performed to judge whether the wireless transmitter 92 receives the first receiving/transmitting acknowledgement packet from the wireless receiver 91. If the first receiving/transmitting acknowledgement packet from the wireless receiver 91 is received, the wireless transmitter 92 continuously waits for another triggering event. That is, the step S61 is performed again.

If the first receiving/transmitting acknowledgement packet from the wireless receiver 91 is not received, a step S66 is performed to judge whether the transmitting failure count of the wireless transmitter 92 exceeds a first threshold value within a third time interval. If the transmitting failure count of the wireless transmitter 92 does not exceed the first threshold value, the step S62 is performed again. Consequently, the wireless transmitter 92 continuously transmits the wireless transmission data D2 through the primary transmission channel. For example, the first threshold value corresponding to the transmitting failure count is 8.

If the judging result of the step S66 indicates that the transmitting failure count of the wireless transmitter 92 exceeds the first threshold value, the wireless transmitter 92 transmits the same wireless transmission data D2 through the at least one secondary transmission channel (Step S67).

After the step S67, a step S68 is performed to judge whether the second receiving/transmitting acknowledgement packet ACK+ containing the primary transmission channel change information and from the wireless receiver 91 is received.

If the second receiving/transmitting acknowledgement packet ACK+ containing the primary transmission channel change information and from the wireless receiver 91 is received, the wireless transmitter 92 transmits another wireless transmission data through another primary transmission channel in response to the primary transmission channel change information in the second receiving/transmitting acknowledgement packet ACK+(Step S69), and the step S61 is performed again.

If the judging result of the step S68 indicates that the second receiving/transmitting acknowledgement packet ACK+ containing the primary transmission channel change information from the wireless receiver 91 is not received, a step S610 is performed to judge whether the transmitting failure count of the wireless transmitter 92 exceeds a second threshold value and all of the secondary transmission channels have been broadcast-polled within a fourth time interval. If the transmitting failure count of the wireless transmitter 92 does not exceed the second threshold value or all of the secondary transmission channels have not been broadcast-polled, the step S67 is performed again. Consequently, the wireless transmitter 92 continuously transmits the same wireless transmission data D2 through other secondary transmission channels that have not been used until the transmitting failure count of the wireless transmitter 92 exceeds the second threshold value and all of the secondary transmission channels have been broadcast-polled. For example, the second threshold value corresponding to the transmitting failure count is 8

As mentioned above, the data transmitting process of the second embodiment implemented by the wireless transmitter 92 is advantageous over the conventional technology. Most of the implementation steps of this embodiment are identical or equivalent to the implementation steps as shown in FIGS. 4A and 4B. In comparison with the first embodiment, the data transmitting process of this embodiment further comprises the steps S63 and S64 in order to increase the data transmission speed. That is, the wireless transmitter 92 has a processing mechanism for determining whether the transmitting/receiving acknowledgement request is transmitted. If the wireless transmitter 92 determines that the transmitting/receiving acknowledgement request is not transmitted, the wireless transmitter 92 continuously transmits the same wireless transmission data D2 through the primary transmission channel for several times within the certain time interval. Since the wireless receiver 91 cooperates with the wireless transmitter 92, the wireless receiver 91 can use the processing mechanism of the step S521 as shown in FIGS. 5A and 5B to increase the data transmission speed between the wireless receiver 91 and the wireless transmitter 92.

It is noted that numerous modifications and alterations may be made while retaining the teachings of the invention. For example, in another embodiment, the data transmitting process is implemented when the wireless peripheral device is in an idle state (i.e., the triggering event is not generated). Consequently, when the frequency hopping procedure is performed or when the wireless peripheral device is in the idle state, the diversity and the application flexibility of the information control capability of the wireless receiver 91 to control the wireless transmitter 92 in the communication application level can be increased.

Figure 7A:
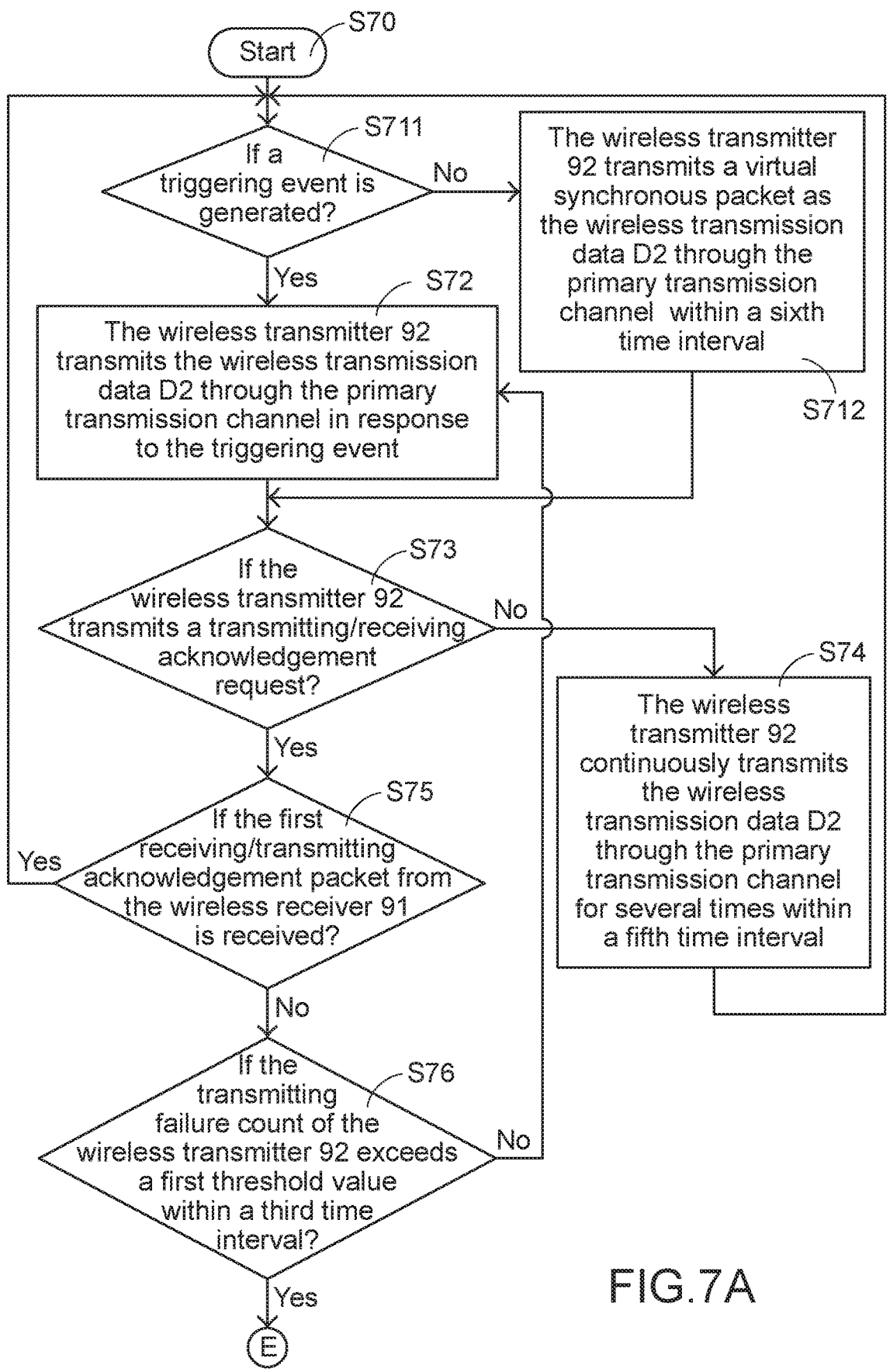
FIGS. 7A and 7B illustrate a flowchart of a data transmitting process of the data transmission method according to a third embodiment of the present invention.
Figure 7B:
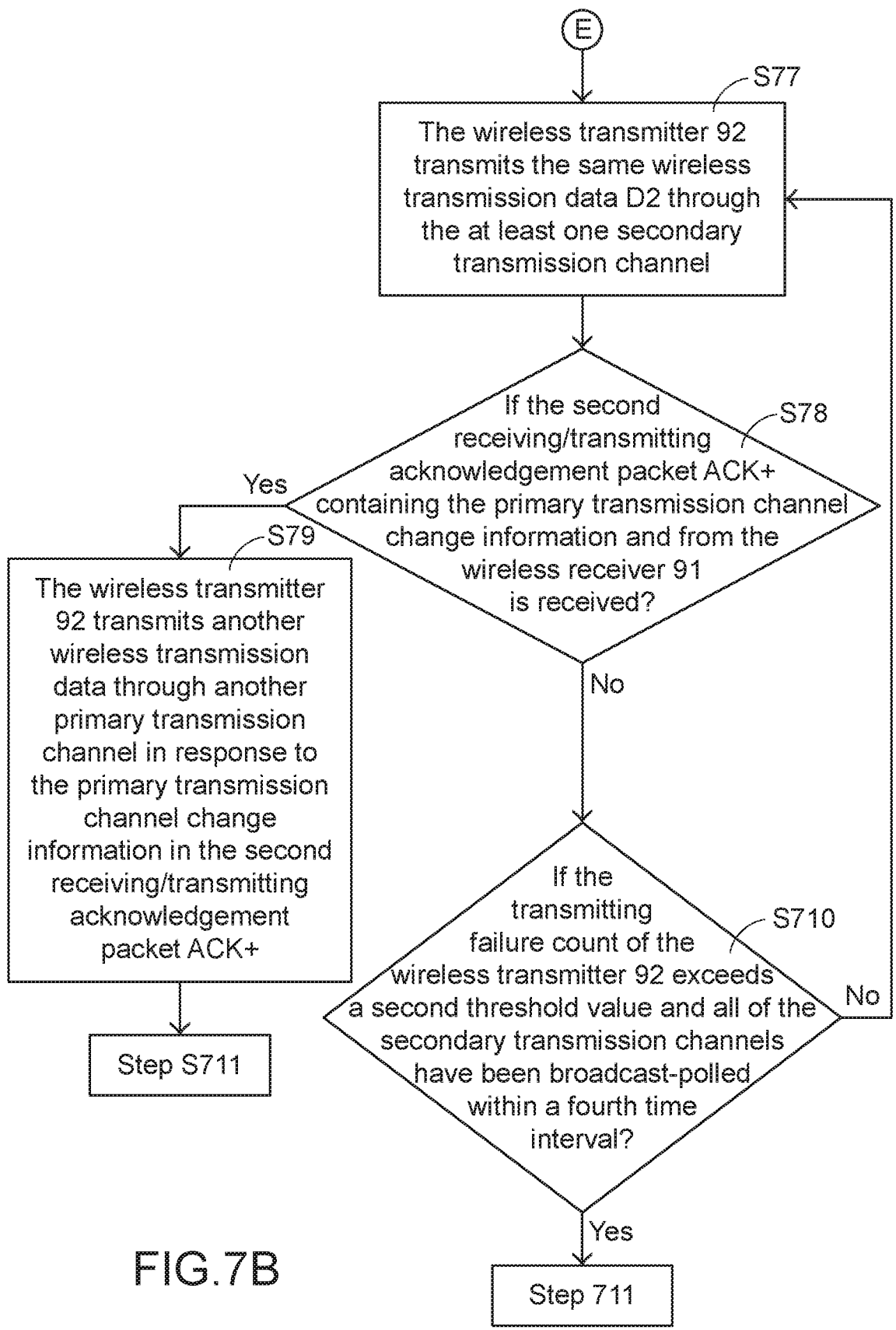

The implementation steps will be illustrated with reference to the flowchart of FIGS. 7A and 7B. FIGS. 7A and 7B illustrate a flowchart of a data transmitting process of the data transmission method according to a third embodiment of the present invention. Moreover, the wireless transmitter 92 cooperates with the wireless receiver 91 to implement a data transmitting process. The implementation steps S72 to S710 of this embodiment are identical or equivalent to the implementation steps S62 to S610 as shown in FIGS. 6A and 6B, and not redundantly described herein.

In comparison with the embodiment of FIGS. 6A and 6B, the step S61 of waiting for the triggering event in FIGS. 6A and 6B is modified to the following steps of this embodiment.

In the step of waiting for the triggering event, a step S711 is performed to judge whether the triggering event is generated. If the judging result of the step S711 indicates that the triggering event is generated, a step S72 is performed. In a step S72, the wireless transmitter 92 transmits the wireless transmission data D2 through the primary transmission channel in response to the triggering event.

If no triggering event is generated, the wireless transmitter 92 transmits a virtual synchronous packet as the wireless transmission data D2 through the primary transmission channel within a sixth time interval (Step S712). Then, the step S73 is performed to judge whether the wireless transmitter 92 transmits a transmitting/receiving acknowledgement request. Then, the subsequent steps are performed.

As mentioned in the embodiment of FIGS. 7A and 7B, the wireless transmitter 92 transmits a virtual synchronous packet as the wireless transmission data D2 when the wireless transmitter 92 is in the idle state (i.e., the triggering event is not generated). That is, a virtual data-transmitting action is performed. Consequently, the wireless receiver 91 can enable the frequency hopping procedure or issue some loadable information through the second receiving/transmitting acknowledgement packet ACK+. Consequently, the lighting effect, the adjustment sensitivity, the sound effect or any other appropriate application level of the wireless transmitter 92 can be correspondingly controlled.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A data transmission method for use between a wireless transmitter and a wireless receiver of a wireless peripheral device, the data transmission method comprising a data receiving process, the data receiving process being implemented by the wireless receiver, the data receiving process at least comprising steps of:
    judging whether a wireless transmission data from the wireless transmitter is received through a primary transmission channel within a first time interval;
    when the wireless transmission data from the primary transmission channel is received, allowing the wireless receiver to be temporarily switched to a transmitting mode and send back a first receiving/transmitting acknowledgement packet to the wireless transmitter which is temporarily switched to a receiving mode;

recognizing and processing the wireless transmission data from the primary transmission channel, and continuously receiving another wireless transmission data through the primary transmission channel;

when the wireless transmission data is not received through the primary transmission channel, judging whether the same wireless transmission data through at least one secondary transmission channel is received within a second time interval;

when the wireless transmission data is received through the at least one secondary transmission channel, allowing the wireless receiver to be temporarily switched to the transmitting mode and send back a second receiving/transmitting acknowledgement packet to the wireless transmitter which is temporarily switched to the receiving mode, wherein the second receiving/transmitting acknowledgement packet contain a primary transmission channel change information, and the wireless transmitter transmits another wireless transmission data through another primary transmission channel in response to the primary transmission channel change information; and recognizing and processing the wireless transmission data from the at least one secondary transmission channel, and continuously receives another wireless transmission data through another primary transmission channel that has not been occupied, wherein when the wireless transmission data is not received through the primary transmission channel, the data transmission method further comprise steps of:

checking whether the second receiving/transmitting acknowledgement packet has been stored in a buffer storage space; and when the second receiving/transmitting acknowledgement packet has not been stored in the buffer storage space, allowing the wireless receiver to add the primary transmission channel change information to the second receiving/transmitting acknowledgement packet and store the second receiving/transmitting acknowledgement packet in the buffer storage space.

2. The data transmission method according to claim 1, wherein when the wireless transmission data from the primary transmission channel is received, the data transmission method further comprise steps of:

judging whether a transmitting/receiving acknowledgement request from the wireless transmitter is received, wherein when no transmitting/receiving acknowledgement request from the wireless transmitter is received, the wireless receiver directly performs the step of recognizing and processing the wireless transmission data from the primary transmission channel and continuously receiving another wireless transmission data through the primary transmission channel; and when the transmitting/receiving acknowledgement request from the wireless transmitter is received, allowing the wireless receiver to be temporarily switched to the transmitting mode and send back the first receiving/transmitting acknowledgement packet to the wireless transmitter which is temporarily switched to a receiving mode, and performing the step of recognizing and processing the wireless transmission data from the primary transmission channel and continuously receiving another wireless transmission data through the primary transmission channel.

* * * * *